United States Patent [19]

Stewart et al.

[11] 4,381,333
[45] Apr. 26, 1983

[54] HIGH TEMPERATURE GLASS THERMAL CONTROL STRUCTURE AND COATING

[76] Inventors: James M. Beggs, Administrator of the National Aeronautics and Space Administration, with respect to an invention of David A. Stewart, Santa Cruz, Calif.; Howard E. Goldstein, Saratoga, Calif.; Daniel B. Leiser, San Jose, Calif.

[21] Appl. No.: 308,007

[22] Filed: Oct. 2, 1981

[51] Int. Cl.³ .......................... B32B 5/18; B32B 17/06
[52] U.S. Cl. ................................ 428/312.6; 350/166; 428/325; 428/428; 428/427
[58] Field of Search ................ 350/166; 428/428, 325, 428/312.6, 427; 264/125

[56] References Cited

U.S. PATENT DOCUMENTS

| | | | |
|---|---|---|---|
| 3,591,248 | 7/1971 | Meumier et al. | 350/166 |
| 3,955,989 | 5/1976 | Nakamura | 264/125 |
| 4,039,297 | 8/1977 | Takenaka | 428/407 |
| 4,093,771 | 6/1978 | Fletcher et al. | 428/312.6 |
| 4,169,655 | 10/1979 | Jacobbson | 428/428 |
| 4,247,599 | 1/1981 | Hopper | 350/166 |
| 4,308,316 | 12/1981 | Gordon | 428/428 |

*Primary Examiner*—William R. Dixon, Jr.
*Attorney, Agent, or Firm*—Darrell G. Brekke; John R. Manning; Robert D. Marchant

[57] ABSTRACT

A high temperature stable and solar radiation stable thermal control coating either useful as such, applied directly to a member to be protected, or applied as a coating on a re-usable surface insulation (RSI) has a base coat layer and an overlay glass layer. The base coat layer has a high emittance, and the overlay layer is formed from discrete, but sintered together glass particles to give the overlay layer a high scattering coefficient. The resulting two-layer space and thermal control coating has an absorptivity-to-emissivity ratio of less than or equal to 0.4 at room temperature, with an emittance of 0.8 at 1200° F. It is capable of exposure to either solar radiation or temperatures as high as 2000° F. without significant degradation. When used as a coating on a silica substrate to give an RSI structure, the coatings of this invention show significantly less reduction in emittance after long term convective heating and less residual strain than prior art coatings for RSI structures.

13 Claims, 1 Drawing Figure

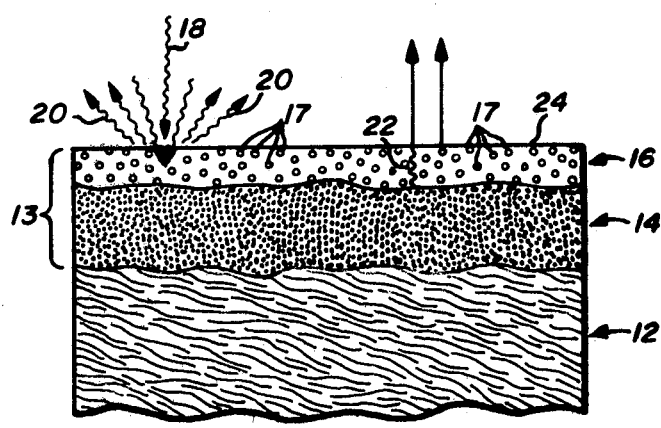

HIGH TEMPERATURE GLASS THERMAL CONTROL STRUCTURE AND COATING

ORIGIN OF THE INVENTION

The invention described herein was made in the performance of work under a NASA contract, and is subject to the provisions of Section 305 of the National Aeronautics and Space Act of 1958, Public Law 85-568 (72 Stat. 435; 42 USC 2457).

BACKGROUND OF THE INVENTION
1. Field of the Invention

This invention relates to a novel re-usable thermal control structure and to a glass coating either for use in the structure or alone for thermal control. More particularly, the invention relates to a glass coating and a re-usable surface insulation (RSI) structure incorporating the coating and having primary application as a space shuttle heat shield, which structure has substantial advantages over prior art thermal control structures.

2. Description of the Prior Art

RSI compositions and structures suitable for use as a space shuttle heat shield are known in the art. Goldstein et al., U.S. Pat. No. 4,093,771 discloses such compositions and structures, which were proven in practice during the successful maiden flight of the space shuttle COLUMBIA. While the borosilicate glass coatings there disclosed exhibit satisfactory physical and optical properties in the convective heating environment expected during re-entry, it would be advantageous if coatings and structures could be provided that are able to withstand a higher use temperature, which have more stable long-term optical properties after repeated re-use during re-entry, and which have a lower strain in the coating induced by its processing.

Other thermal control coatings for space satellites or vehicles are also known in the art, but they are primarily designed for use at moderate temperatures, such as about 150° F. These prior art thermal control coatings typically contain a pigment, such as zinc titanate, zinc, titanium oxide or zinc oxide, together with an organic or inorganic binder for ease of application and adherence on primarily non-porous skins of the satellites or vehicles. None of these types of prior art coatings were designed for use on re-usable re-entry space vehicles, since they are unstable at the high temperatures produced during re-entry, and are not suited for application to a low density silica substrate.

Thus, while the art of thermal control coatings and structures is a well developed one, a need remains for further development of RSI coatings and structures, especially adapted for use in space shuttle heat shields and similar applications.

SUMMARY OF THE INVENTION

Accordingly, it is an object of this invention to provide a re-usable thermal control coating having improved stability at elevated temperatures.

It is another object of the invention to provide such a coating having improved stability in the presence of solar radiation.

It is still another object of the invention to provide a thermal control coating having a reduced loss of volatile components in a convective heating environment.

It is yet another object of the invention to provide a thermal control coating having a reduced residual strain as applied in a thermal control structure.

It is a still further object of the invention to provide a re-usable thermal control structure of improved stability for use in re-entry of a space vehicle to a planet's atmosphere.

The attainment of these and related objects may be achieved through the use of the novel thermal control coating herein disclosed. In one aspect of the invention, a coating for a re-usable thermal control structure comprises a first, high emittance glass layer and a second, high scattering coefficient glass layer on the first layer. The second layer of the coating includes discrete but sintered together glass particles of a size which will scatter incident short wavelength radiation. The second glass layer thickness is optimized so that the first glass layer retains the ability to emit thermal radiation through it while preventing incoming solar radiation from reaching the first layer and being absorbed into the substrate.

In another aspect of the invention, when used as coatings on a low density, porous rigid, insulation material, such as fibrous silica or other suitable ceramic substrate, there is produced a re-usable thermal control structure of improved stability in multiple re-use. This thermal control structure is especially suited for withstanding conditions in outer space and the high temperature convective heating environment encountered in entry of a space vehicle into a planet's atmosphere.

The attainment of the foregoing and related objectives, advantages and features of the invention should be more readily apparent to those skilled in the art after review of the following more detailed description of the invention, taken together with the drawing, in which:

BRIEF DESCRIPTION OF THE DRAWING

The sole FIGURE of drawing is a cross-section view of a re-usable thermal control structure in accordance with the invention.

DETAILED DESCRIPTION OF THE INVENTION

Turning now to the sole FIGURE of drawing, there is shown a heat control structure in accordance with the invention. There is shown a low density fibrous, porous silica insulation layer 12, which will be referred to as a "substrate" for purposes of this invention. It should be recognized that the insulation 12 is typically provided as a layer on another surface to be protected thermally, such as on the metal skin of the space vehicle. Coating 13 in accordance with this invention serves to protect the insulation substrate 12 during the harsh, high temperature, convective heating environment encountered during the return of a space vehicle to the earth's atmosphere or entry into the atmosphere of another planet. The coating 13 comprises a first, high emittance glass layer 14 on the insulation substrate 12 and a second, high scattering coefficient glass layer 16 on the first glass layer 14. In a preferred form of the invention, the high emittance glass layer 14 is a reactive borosilicate glass combined with an emittance agent, such as silicon tetraboride, silicon hexaboride, boron or silicon carbide, and a flux glass such as Corning 7070 or 7740, obtainable from Corning Glassworks.

Bonded to the first, high emittance glass layer 14 is a second, high scattering coefficient glass layer 16 on the first glass layer 14. In a preferred embodiment of the invention, the second glass layer 16 is formed from a thermally stable glass frit having a lower thermal expansion coefficient than the first glass layer 14 and containing no flux glass or emittance agent. Suitable thermally stable glass frits include fused silica, such as Corning 7940, a reactive borosilicate glass, such as previously described for the first layer 14, but containing a higher silica content, or other similar low expansion coefficient glass powders of less than 325 mesh size. The second glass layer 16 is formed to include discrete but sintered together particles 17 which are of a size which will scatter incident short wavelength radiation 18, such as solar radiation, as shown at 20, but which transmits thermal radiation from layer 14, as shown at 22.

The first, high emittance glass layer typically has a thickness of about 0.3 mm to 0.45 mm. The second, high scattering coefficient glass layer 16 serves to reduce the surface absorptivity during exposure to incident solar radiation, but allows outward radiation of thermal energy from the insulation substrate 12 and the first glass layer 14 during exposure to a convectively heated environment. For this reason, the second glass layer 16 (scattering coefficient $\approx 30$ mm$^{-1}$) has a thickness ranging from 0.013 mm to 0.13 mm depending on the requirements for the thermal control coating 13.

In its preferred form, coating 13 in accordance with this invention has unique optical properties of a ratio of absorptivity, $\alpha$, to emissivity, $\epsilon(\alpha/\epsilon) \leq 0.4$ at room temperature, with a total hemispherical emittance of 0.8 or greater at 1200° F. The coating 13 in accordance with this invention has improved stability because of its ability to withstand temperatures up to 2000° F. during atmospheric re-entry and space exposure to solar radiation with little change in the above optical properties. While these unique properties of the coatings in accordance with this invention make them useful by themselves in solar radiation and temperatures up to 2000° F., these properties make the coatings especially suited for use as a protective coating on fibrous silica or other low density ceramic substrates used as primary thermal control structures on space vehicles.

When used alone, the space and re-entry thermal control embodiments of the coatings of this invention have an $\alpha/\epsilon$ at room temperature of 0.4 for thermal control in space, which is also true of prior art coatings, but in addition, the coatings of this invention have an emittance of at least about 0.8 at 1200° F. for re-entry. Coatings of the prior art are limited to a relatively low temperature space environment, since they were not designed for use in re-entry. The coatings of the present invention retain these properties after re-entry exposure to 1200° F. and are, therefore, unique in that they are re-usable. They are all ceramic, can retain their optical and physical properties to temperatures as high as 2000° F. and can be used on low thermal expansion substrates.

The high temperature re-entry thermal control overlay layer 16 of this invention improves the performance of the prior art coatings described in U.S. Pat. No. 4,093,771 for this purpose in a convective heating environment. In particular, the coatings of this invention exhibit a much greater stability in their properties after multiple use, as shown by a decrease in emittance of the coatings of only from 0.92 to 0.88 in a simulated 100 flight test in a convectively heated environment as compared to a decrease in emittance from 0.9 to 0.8 of the coatings in U.S. Pat. No. 4,093,771. These prior art coatings are also under more residual strain as formed than the coatings of the present invention. These improvements in physical and optical properties of the thermal control coatings in the present invention give thermal control structures in combination with fibrous silica substrates, which structures have an improved usable lifetime, due to their greater stability.

The following non-limiting examples describe the invention further and represent preferred embodiments of the invention in practice.

EXAMPLE 1

The following example illustrates a preferred general procedure for preparing thermal control coatings in accordance with the invention. The procedure for preparing the high temperature glass coatings for thermal control in space and re-entry environments in accordance with this invention is divided into two parts, since the coatings are composed of the two distinct layers 14 and 16. These layers will be identified as a high emittance base coat layer 14 and an overlay layer 16.

The base coat layer 14 is prepared in accordance with the procedure taught in U.S. Pat. No. 4,093,771, the disclosure of which is hereby incorporated by reference herein. In accordance with that procedure, a low expansion coefficient thermally stable glass frit is blended with an emittance agent and a flux glass. The preferred frit is a reactive borosilicate glass prepared by blending from two to ten parts by weight of boron oxide with 100 parts by weight of a porous, high silica borosilicate glass, such as Vycor 7930, as described in U.S. Pat. No. 2,286,275, and obtainable from Corning Glassworks. The Vycor 7930 is desirably provided as a 325 mesh glass powder. The preferred composition for the base coat layer 14 contains from about 2 to 4% by weight boron oxide in the Vycor 7930 glass. The frit is prepared by dissolving the boron oxide in 200 to 400 parts by weight de-ionized water and adding the Vycor 7930 glass powder to this mixture. The mixture is stirred at about 95° C. until it forms a thick paste. It is then dried for up to 24 hours at 75° to 95° C. The resulting cake is broken up, screened and fired at 1149° C. (2000° F.) for one hour or more. The cake is then ground to powder and screened through an 80 to 325 mesh screen. The grinding is relatively easy, since the cake is only sintered, not fused. The resulting reactive glass frit is so called because it is a two-phase glass system with a very reactive high boron borosilicate glass layer on the outside, covering a more refractory low boron content borosilicate glass in the core of each particle. The original porosity of the Vycor 7930 glass and the ability to seal that porosity by sintering is well known in the art. Further details on the formation of the frit by sintering with boron oxide to form a two-phase glass particle, which is not readily soluble in water and which can be used to form a coating by firing at 1204° C. (2200° F.) or less, are provided in the above-referenced U.S. Pat. No. 4,093,771.

In order to complete the base coat of the present invention, the glass frit is combined with an emittance agent, such as silicon tetraboride, silicon hexaboride, boron or silicon carbide, and a flux glass such as Corning 7070 to 7740 glass soda borosilicate glass). The components are all powders less than 80 mesh particle size. The proportion of these additives may vary from 2 to 6 weight percent each, depending on the required firing temperature and thermal expansion properties desired. For preparation of the base coat layer 14, a carrier such as ethyl alcohol, and a pre-binder such as methyl cellulose, are used in a ratio of 30 to 50% by weight solid components. The carrier solution is prepared by adding 2% by weight Methocel-A4M methyl cellulose in water solution to the ethyl alcohol to give a 0.15 to 0.35 weight percent methyl cellulose solution. The powder and carrier solution mixture is ball milled in an alumina ball mill with alumina balls for from 3 to 6 hours. The ball milled mixture is sprayed on the silica RSI substrate 12, or any other porous silica structure, using an air brush or spray gun. The RSI substrate 12 is machined to 0.3% smaller than the required final size, to correct for shrinkage and coating thickness, in accordance with the teachings of U.S. Pat. No. 4,093,771.

The overlay layer 16 which is unique to this invention, is prepared in a manner similar to the base coat layer 14, with a thermally stable glass frit that desirably has a lower thermal expansion coefficient than the glass frit used in the base coat layer 14. Acceptable glass frits included fused silica, such as Corning 7940, a reactive borosilicate glass of the same type as used in the base coat layer, but having a higher silica content, or other similar low expansion coefficient 325 mesh glass powder. The solution for preparation of the overlay layer 16 is completed by mixing the glass frit with the carrier solution as above, to give a slurry, and ball milling the slurry for from 6 to 16 hours to optimize the particle size of the glass frit. In a preferred embodiment, most particles 17 should have a size between about 1 micron ($\mu$) and $4\mu$ after ball milling. The overlay layer 16 is then sprayed on in the same manner as the base coat layer 14, being careful not to let the surface of the base coat or overlay dry out as the overlay is applied, in order to avoid delamination.

After coating, the RSI tile substrate 12 or other silica material is dried for 2 to 5 hours at a temperature of from about 20° to 70° C. After drying, the coated tile 12 is glazed in a furnace for one to two hours at temperatures from about 1092° C. (2000° F.) to 1231° C. (2250° F.). The furnace used should be free of alkali contamination and the tile 12 must be inserted into the furnace at glazing temperature and cooled by rapid removal from the furnace to minimize stress in the resulting coating 13.

An especially preferred mixture for the overlay layer 16 is prepared by mixing 0.238 lbs. (108 g) of Vycor 7913 glass powder at 325 mesh with 0.423 lbs. (192 g) of carrier solution. The resulting mixture is ball milled for six hours to mix and optimize the particle size of the 7913 glass for optical property control within the above size range. The preferred overlay composition is used in conjunction with both of the following preferred embodiments of mixtures for the base coat layer 14.

For the space and re-entry thermal control coating 13 capable of 1200° F. convective heating exposure without degradation, the preferred base coat glass mixture in accordance with U.S. Pat. No. 4,093,771 contains 5% by weight tetraboron silicide, 5.6% by weight of Corning 7070 soda borosilicate flux glass and 89.4% by weight reactive glass frit as described above, containing 6 weight percent boron oxide. The base coat layer glass mixture is mixed with the carrier solution, to give 36 weight percent glass mixture and 64 weight percent carrier solution, and ball milled for six hours. Slurry is then sprayed on the silica RSI substrate 12. After the preferred base coat is applied, 0.122 lbs. (55.6 g) of the well mixed preferred overlay slurry is applied for each 100 in$^2$ (645 cm$^2$) of surface covered by the base coat. The two-layered coating is then dried for five hours at 60° to 80° F. and fired at 2050° F. for one and one-half hours.

For this type of glass, the firing temperature of the coating 13, the ball milling of the solution for the overlay layer 16 and the thickness of the overlay layer 16 are all critical for producing a coating with desirable optical properties. These three processing variables determine the overall optical properties of the coating 13 by establishing the relative transparency and scattering coefficient for the overlay layer 16 at different wavelengths. For the space and re-entry thermal control coating 13 with absorptivity/emissivity $(\alpha/\epsilon) \leq 0.4$ and a totol hemispherical emittance $(\epsilon_{TH})$ of 0.8 at 1200° F., the overlay layer 16 must be relatively transparent to the thermal radiation being emitted from the high emittance base coat layer 14 ($\epsilon_{TH}=0.92$). This is necessary, since the emittance of the overlay layer 16 by itself is less than 0.6 in this wavelength range. At the same time, the overlay layer 16 must have a high enough scattering coefficient to reflect or scatter back incoming solar radiation before it reaches the base coat layer 14. The coating 13 of this invention achieves these properties because the Vycor 7913 borosilicate glass overlay is relatively transparent at wavelengths between about 0.35 micron and 5 micron. Because the overlay layer 16 is is formed from discrete but sintered glass particles 17, the overlay layer 16 scatters incident short wavelength (0.35 micron-2.3 micron) radiation 18 back, and allows emitted thermal radiation 22 to be transmitted through it. Ball milling the Vycor 7913 glass particles makes the particles small enough to scatter incoming solar radiation (about $1\mu$ in size). This requirement means that the ball milled particles should not be significantly altered in size during the firing process at 2050° F. If the firing temperature of the overlay layer 16 is too high, or the ball milling too long, the particles will sinter and fuse together, increasing their effective size and reducing the resulting scattering coefficient of the layer 16. Such a result makes the overlay layer 16 more transparent and increases the $\alpha/\epsilon$ ratio of the overall coating 13, due to the high emittance of base coat layer 14.

Also, the optical properties of the coating 13 are a function of the thickness of the overlay layer 16. The desired properties specified above are obtained by making the overlay have a high enough scattering coefficient at the shorter wavelengths 18 and yet be thin enough to transmit adequate solar radiation 22 from the base coat layer 14 to give a total emittance of 0.8° to 1200° F. The optical properties of this invention are, therefore, quite sensitive to the ball milling of the mixture for the overlay layer 16, the firing temperature and the thickness of the overlay layer 16. In preferred embodiment, the coatings 13, 14 and 16 have a thickness of 0.038 mm, 0.030 mm, and 0.008 mm, respectively, and a particle size 17 of $1\mu$ to $4\mu$. Coatings 13 in accordance with this invention may be implemented in a variety of ways by those skilled in the art to suit a particular requirement by varying the above parameters, as well as varying the constituents of the overlay layer 16 and the base coat layer 14.

EXAMPLE 2

For use as a thermal control coating 13 having high thermal stability and emissivity at 2300° F. and applied to a similar substrate 12 attached to the skin of a space vehicle, a preferred glass mixture for the base coat layer 14 is composed of 2.5 weight percent tetraboron silicide and 97.5 weight percent reactive glass frit, containing 5.75 weight percent boron oxide. For this coating 0.048 lbs. (22 g) of the well-mixed preferred overlay slurry mixture is required per 100 in$^2$ (645 cm$^2$) of surface covered with the base coat composition. The overlay is sprayed on in the same manner as the base coat, being careful not to let the surface of the base coat or overlay dry out as the overlay is applied. In this embodiment, the overlay layer 16 is thin enough (e.g., up to about 0.005 mm) as applied to allow radiation from the base coat to emit through it at high temperature, resulting in $\epsilon_{TH} > 0.90$ at a temperature of 2300° F. The higher silica content in the overlay layer 16 reduces the expansion coefficient of the composite coating 13, and therefore reduces the residual strain of the coating 13 as applied. In addition, the higher silica content in the overlay layer 16 increases the viscosity of the coating surface 24. This increased viscosity decreases the rate at which volatiles, especially boron oxide, are removed from the coating 13. As a result, significantly less optical property degradation in the base coat layer 14 occurs in a convective heating environment, thus increasing the useful life of the coating for atmospheric entry and re-entry purposes.

EXAMPLE 3

The thickness of the overlay layer 16 of the thermal control coating 13 described immediately above is increased, resulting in an $\alpha/\epsilon$ ratio of 0.49 and an emittance of 0.8 at 1200° F. in the resulting coating 13. After the preferred base coat is applied as described above, 0.093 lbs. (42.1 g) of the well-mixed preferred overlay slurry, which has been ball milled for 16 hours, is applied for each 100 in$^2$ (645 cm$^2$) of surface covered with the base coat. The resultant two-layered coating is then dried and fired as above.

EXAMPLE 4

High temperature re-entry thermal control coatings 13 applied to fused silica tile substrates 12 are made by substituting other refractory materials for the Vycor 7913 in the overlay layer 16 for the high temperature re-entry thermal control coating preferred embodiment of Example 1. Such substitutions should either be more viscous or have a higher thermal expansion coefficient than the preferred base coat layer 14. In general, this means that such refractory materials should have a higher silica content than employed in the base coat layer 14. Equivalent results to those obtained for the high temperature re-entry thermal control coating 13 embodiment of Example 2 are obtained with the substitution of fused silica powder, borated and unborated porous Vycor 7930 glass powder in equivalent amounts.

It should now be apparent to those skilled in the art that a thermal control coating and thermal control structure capable of achieving the stated objects of the invention has been provided. The coating of the present invention is superior to previous space and re-entry thermal control coatings, because it retains its optical and physical properties to temperatures as high as 2000° F. Coatings of the prior art are typically limited to temperatures of 500° to 600° F., due to the presence of degradable binders. Additionally, the present invention is the only all ceramic coating layer which meets the dual purpose requirements for an RSI insulation coating of an $\alpha/\epsilon$ ratio $\leq 0.4$ at room temperature with an $\epsilon_{TH}$ at 1200° F. of 0.8. In addition to meeting these requirements, the coating of this invention exhibits less degradation from solar radiation in space than prior art coatings. Such prior art coatings are not re-usable after exposure to 1200° F. The preferred coating of Example 2 has an emittance of 0.88 after 100 convectively heated cycles to 2300° F., while prior art coatings in accordance with the teachings of U.S. Pat. No. 4,093,771 retain an emittance less than or equal to 0.8 after the same exposure. Additionally, the coating of Example 2 has less tensile strain as formed, thus giving an improved overall lifetime in an atmospheric re-entry environment.

It should further be apparent to those skilled in the art that various changes in form and detail of the invention as shown and described above may be made. It is intended that such changes be included within the spirit and scope of the claims appended hereto.

What is claimed is:

1. A re-usable, thermal control structure comprising ceramic substrate and a coating including a first, high emittance glass layer on said substrate and a second, high scattering coefficient glass layer on said first layer, said second layer including discrete but sintered together glass particles in said layer which are of a size which will scatter incident short wavelength radiation, but which is substantially transparent to thermal radiation.

2. The re-usable, thermal control structure of claim 1 in which said second glass layer has a higher silica content than said first glass layer.

3. The re-usable, thermal control structure of claim 1 in which said first glass layer comprises a reactive borosilicate glass frit reaction cured with an emittance agent and a flux glass.

4. The re-usable, thermal control structure of claim 3 in which said emittance agent is silicon tetraboride, silicon hexaboride, boron or silicon carbide, and the flux glass is a soda borosilicate glass.

5. The re-usable, thermal control structure of claims 1, 2, 3 or 4 in which said second glass layer is a borosilicate glass.

6. The re-usable, thermal control structure of claim 1 in which the ceramic substrate is fibrous.

7. A thermal control coating comprising a inner, high emittance glass layer and a outer high scattering coefficient glass layer on said inner layer, said outer layer including discrete but sintered together glass particles of a size which will scatter incident short wavelength radiation, but which is substantially transparent to thermal radiation.

8. The coating of claim 7 in which said outer glass layer has a higher silica content than said inner glass layer.

9. The coating of claim 7 in which said inner glass layer comprises a reactive borosilicate glass frit reaction cured with an emittance agent and a flux glass.

10. The coating of claim 7 in which said emittance agent is a boron silicide, boron or silicon carbide, and the flux glass is a soda borosilicate glass.

11. The coating of claims 7, 8, 9 or 10 in which said outer glass layer is a borosilicate glass.

12. A glass coating comprising a layer of discrete but sintered together glass particles of a size which will scatter incident solar radiation but substantially transmits emitted thermal radiation.

13. The glass coating of claim 12 in which said glass particles are a borosilicate glass.

* * * * *